(12) United States Patent
Dewey et al.

(10) Patent No.: US 11,361,773 B2
(45) Date of Patent: Jun. 14, 2022

(54) USING NON-AUDIO DATA EMBEDDED IN AN AUDIO SIGNAL

(71) Applicant: Roku, Inc., Los Gatos, CA (US)

(72) Inventors: Thomas Richard Henry Dewey, Cambridge (GB); Robert Caston Curtis, Los Gatos, CA (US)

(73) Assignee: Roku, Inc., San Jose, CA (US)

( * ) Notice: Subject to any disclaimer, the term of this patent is extended or adjusted under 35 U.S.C. 154(b) by 74 days.

(21) Appl. No.: 16/553,579

(22) Filed: Aug. 28, 2019

(65) Prior Publication Data

US 2021/0065720 A1 Mar. 4, 2021

(51) Int. Cl.
G06F 3/16 (2006.01)
H04R 5/04 (2006.01)
G10L 19/008 (2013.01)
H04R 3/14 (2006.01)
H04R 5/02 (2006.01)
H04S 1/00 (2006.01)

(52) U.S. Cl.
CPC ............ *G10L 19/008* (2013.01); *G06F 3/162* (2013.01); *H04R 3/14* (2013.01); *H04R 5/02* (2013.01); *H04R 5/04* (2013.01); *H04S 1/007* (2013.01)

(58) Field of Classification Search
CPC ......... G10L 19/008; G06F 3/162; H04R 3/14; H04R 5/02; H04R 5/04; H04S 1/007
See application file for complete search history.

(56) References Cited

U.S. PATENT DOCUMENTS

| | | | |
|---|---|---|---|
| 6,737,957 B1* | 5/2004 | Petrovic | G10L 19/018 340/5.86 |
| 2007/0038999 A1* | 2/2007 | Millington | G06F 3/048 718/100 |
| 2014/0172141 A1* | 6/2014 | Mangold | H04B 11/00 700/94 |
| 2017/0019748 A1* | 1/2017 | Cheon | H04R 29/007 |
| 2017/0213567 A1* | 7/2017 | Stokking | G10L 21/0224 |
| 2017/0245079 A1* | 8/2017 | Sheen | H04R 9/046 |
| 2019/0116395 A1* | 4/2019 | Kerdranvat | H04N 21/8106 |
| 2019/0287543 A1* | 9/2019 | Sugai | H04R 29/001 |
| 2020/0005830 A1* | 1/2020 | Wasada | H04B 17/21 |
| 2020/0091958 A1* | 3/2020 | Curtis | H04N 5/607 |

* cited by examiner

*Primary Examiner* — Daniel R Sellers
(74) *Attorney, Agent, or Firm* — Sterne, Kessler, Goldstein & Fox P.L.L.C.

(57) ABSTRACT

Embodiments included herein generally relate to using non-audio data embedded in an audio signal. More particularly, embodiments relate to using non-audio data embedded into the audio signal to control an audio configuration of a plurality of speakers and/or to measure a delay of a playback device.

15 Claims, 7 Drawing Sheets

200

```
┌─────────────────────────────────────────────────────┐
│ Transmitting media content having a bias signal embedded │
│         therein to each of a plurality of speakers          │
│                           210                               │
└─────────────────────────────────────────────────────┘
                              │
┌─────────────────────────────────────────────────────┐
│    Configuring each of the plurality of speakers with a     │
│      respective state from among the plurality of states    │
│                           220                               │
└─────────────────────────────────────────────────────┘
                              │
┌─────────────────────────────────────────────────────┐
│ Modifying an audio configuration of one or more speakers │
│      of the plurality of speakers based on the bias signal  │
│                           230                               │
└─────────────────────────────────────────────────────┘
```

FIG. 2

USING NON-AUDIO DATA EMBEDDED IN AN AUDIO SIGNAL

TECHNICAL FIELD

Embodiments included herein generally relate to using non-audio data embedded in an audio signal. More particularly, embodiments relate to using non-audio data embedded into the audio signal to control an audio configuration of a plurality of speakers and/or to measure a delay of a playback device.

BACKGROUND

In entertainment systems, media content may be distributed to any number of playback devices, such as speakers and/or televisions. However, in some situations, a user may want to showcase different features of different types of playback devices and/or determine a latency of the playback device. In the former situation, the user may have limited access to activate and/or deactivate the different types of playback devices, such that the user may be limited in their ability to showcase the different features of the various playback devices. In the latter situation, each individual playback device may incur a distinct latency, such that the user must account for such latency on a device by device basis.

BRIEF DESCRIPTION OF THE DRAWINGS

The accompanying drawings, which are incorporated herein and form a part of the specification.

FIG. 2 illustrates a flowchart for controlling one or more speaker devices based on a bias signal, according to some embodiments.

In the drawings, like reference numbers generally indicate identical or similar elements. Additionally, generally, the left-most digit(s) of a reference number identifies the drawing in which the reference number first appears.

SUMMARY

Provided herein are system, apparatus, article of manufacture, method and/or computer program product embodiments, and/or combinations and sub-combinations thereof, for using non-audio data embedded into the audio signal to control an audio configuration of plurality of speakers and/or to measure a delay of a playback device.

In some embodiments, the present disclosure is directed to a method for controlling one or more speaker devices based on a bias signal. For example, the method may include transmitting media content having a bias signal embedded therein to each of a plurality of speakers. In some embodiments, the bias signal may indicate a current state from among a plurality of states to be activated. The method may further include configuring each of the plurality of speakers with a respective state from among the plurality of states. The method may also include modifying an audio configuration of one or more speakers of the plurality of speakers based on the bias signal.

In some embodiments, the present disclosure is directed to a method for measuring a latency of a playback device. For example, the method may include measuring a clocking sample from an internal clock of a media source. The method may also include encoding the clocking sample to generate a first audio stream and combining the first audio stream with a second audio stream to generate a combined audio stream. The method may further include transmitting the combined audio stream through a playback device. The method may also include decoding audio samples received from the playback device to extract timestamps of the playback device. The method may further include comparing the extracted time stamps with the clocking sample to determine a latency of the playback device.

Further features and advantages of the embodiments disclosed herein, as well as the structure and operation of various embodiments, are described in details below with reference to the accompanying drawings. It is noted that this disclosure is not limited to the specific embodiments described herein. Such embodiments are presented herein for illustrative purposes only. Additional embodiments will be apparent to a person skilled in the relevant art based on the teachings contained herein.

DETAILED DESCRIPTION OF THE INVENTION

Provided herein are system, method, computer program product and/or device embodiments, and/or combinations thereof, to using non-audio data embedded into the audio signal to control an audio configuration of a plurality of speakers and/or to measure a delay of a playback device.

Figure 1:
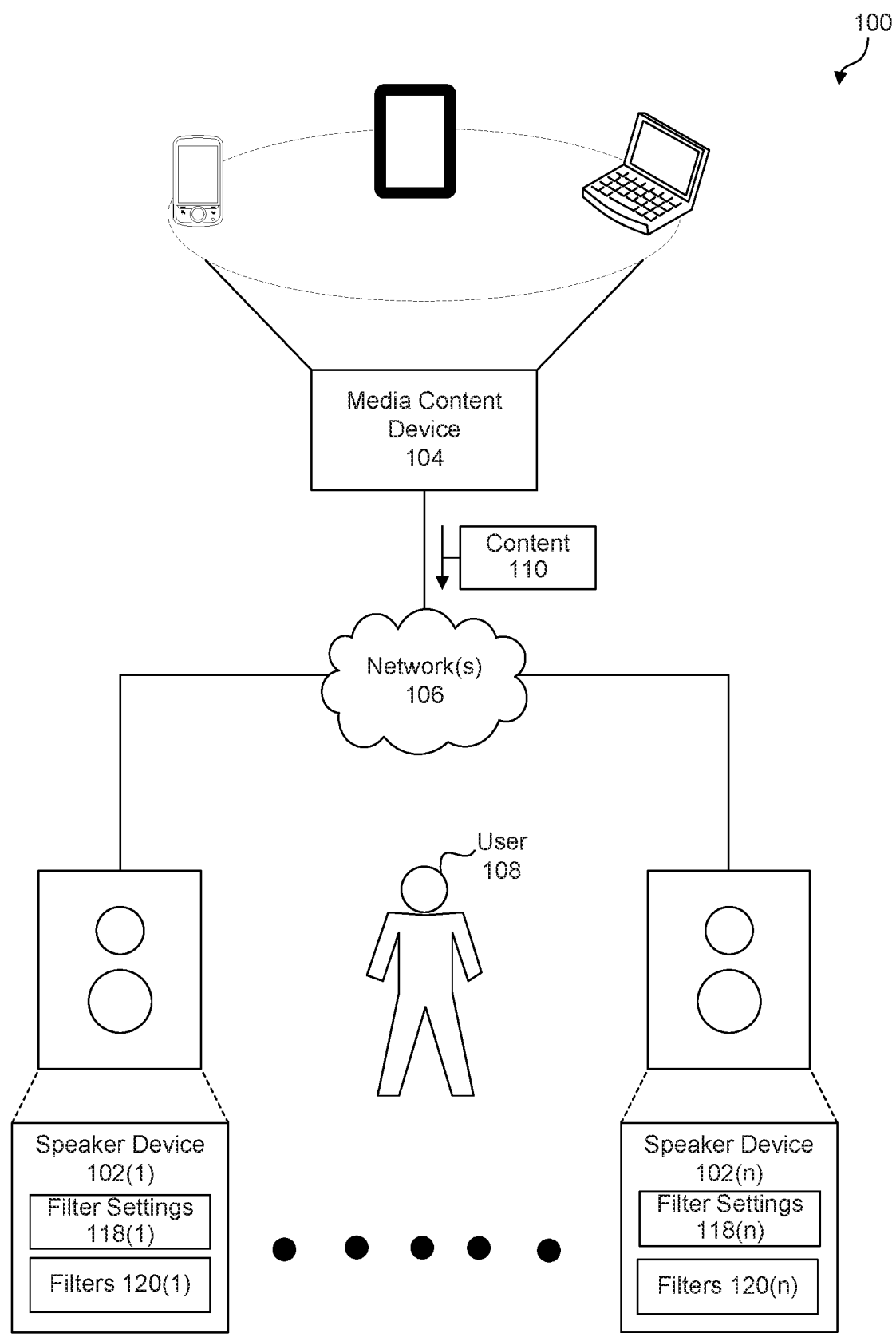
FIG. 1 illustrates an entertainment system with a plurality of heterogeneous speaker devices, according to some embodiments.

FIG. 1 illustrates an entertainment system for providing audio content via a plurality of heterogeneous speaker devices. Referring to FIG. 1, an entertainment system 100 may include a plurality of speaker devices 102, e.g., speaker devices 102(1)-102(n), collectively referred to as speakers 102, placed in any location and/or configuration within a listening environment, and a media content device 104. Each speaker device 102 may be wired or wireless. Although FIG. 1 illustrates two speaker devices 102, the entertainment system 100 may include any number of speaker devices 102, as should be understood by those of ordinary skill in the art.

The media content device 104 may be, without limitation, a media player, television, a wireless device, a smartphone, a tablet computer, a laptop/mobile computer, a handheld computer, a server computer, an in-appliance device, Internet of Things (IoT) device, streaming media player, a game console, and/or an audio/video receiver. In some embodiments, the media content device 104 may be located in the same listening environment as the plurality of speaker devices 102. Additionally, or alternatively, the media content device 104 may be located remotely from the speaker devices 102. The speaker devices 102 and the content device 104 may communicate via a communication network(s) 106. The communication network 106 may include any or all of a wired and/or wireless private network, personal area network (PAN), Local-Area Network (LAN), a Wide-Area Network (WAN), or the Internet.

In some embodiments, the speaker devices 102 may be different types of audio devices. For example, the speaker devices 102 may be, without limitation, a combination of one or more different types of speakers, such as full-range drivers, subwoofers, woofers, mid-range drivers, tweeters, sound bars, and/or coaxial drivers, to name just some examples. It should be understood by those of ordinary skill in the arts that each of the speakers 102 may be designed to produce sound at different frequencies. For example, a tweeter may be designed to produce sound at high audio frequencies, e.g., 2,000 Hz to 20,000 Hz, whereas subwoofers and woofers may be designed to produce sound at low audio frequencies, e.g., 40 Hz up to 500 Hz. As such, each speaker 102 may be designed to produce different features of an audio signal, e.g., tweeters may be designed to produce more treble, whereas woofers and sub-woofers may be designed to produce more bass and sub-bass, respectively.

In some embodiments, media content 110 may be stored on the media content device 104 and transmitted to each of the speakers 102, such that the speakers 102 synchronously reproduce the media content 110. To illustrate the different characters of the plurality of speakers 102, the media content 110 may be embedded with a control signal, which may cause different ones of the speakers 102 to modify its respective audio configuration in-real time. In some embodiments, the control signal may be a direct current (DC) bias signal that indicates a respective state for each speaker of the plurality of speakers 102. In some embodiments, the DC bias signal may be transmitted over two channels, e.g., a left channel and a right channel, of each of speaker 102. The DC bias signal may include a plurality of states on each channel. For example, the DC bias signal may include no bias, a positive bias, or a negative bias. Thus, in some embodiments, the DC bias signal may be used to create, for example, nine (9) different states. It should be understood by those of ordinary skill in the art that the bias signal shifts the signal of the media content 110. It should be further understood by those of ordinary skill in the arts that the number of states described herein is merely an example, and that any number of states may be used in accordance with aspects of the present disclosure. For example, in some embodiments, in order to increase the number of states, the DC bias signal may be a more granular DC bias with more than three biases. Table I illustrates an example table of the nine (9) different states for the speakers 102.

TABLE I

| Left Channel | Right Chanel |
|---|---|
| 0 | −1 |
| 0 | 0 |
| 0 | 1 |
| 1 | −1 |
| 1 | 0 |
| 1 | 1 |
| −1 | −1 |
| −1 | 0 |
| −1 | 1 |

Embedding the bias signal into the media content may include mastering the media content 110. For example, mastering the media content 110 may include filtering the media content 110 using, for example, a high-pass filter to remove any inherent bias in the media content 110. Mastering the media content 110 may further include normalizing the media content 110. In some embodiments, normalizing the media content 110 may include adjusting the media content 110 by, for example, −3 dB to ensure that the media content 110 has headroom to account for the bias signal. Mastering the media content 110 may also include combining the normalized media content with the bias signal. In some embodiments, the media content 110 may be mastered and loaded onto the media content device 104. In further embodiments, the media content 110 may be mastered in in-real time by a user operating the media content device 104.

The media content 110 may also include one or more transitions to allow for the speakers 102 to seamlessly transition from one state to another without any interruptions in the media content 110. In order to transition from one state to another state, the changes in the DC bias signal may be embedded in the media content 110 at low frequencies, e.g., about 8 Hz, such that the transition(s) are sub-audible. In some embodiments, the transitions may be filtered to remove any frequencies audible to humans.

Each of the speakers 102 may be preloaded with a data file indicating a state for each of the speakers 102. In some embodiments, the data file may be side-loaded into each speaker 102 and stored in a repository of the speaker 102. Thus, in some embodiments, the speakers 102 may be updated with a new data file indicating the states of the speakers 102. In some embodiments, the speakers 102 may each be configured to recognize an operating state based on the DC bias signal and to change its audio configuration in response to receiving the DC bias signal indicating which state(s) is active. In some embodiments, the speakers 102 may also be configured to recognize the state of each of the other speakers 102. Based on recognizing the state of each of the other speakers 102, each individual speaker 102 may be further configured to change its audio configuration according to which other speakers 102 are active within the system 100. For example, when a subwoofer changes its audio configuration to be unmuted, it may also be aware that tweeter may also be unmuted, and as such, the subwoofer may changes its audio configuration such that the tweeter is a dominant speaker. In some embodiments, each speaker 102 may be configured to filter out the bias signal, such that the bias signal does not affect the quality of the media content 110. In further embodiments, the speakers 102 may be choreographed such that different ones of the speakers 102 may illustrate its different audio characteristics at different points in time.

In some embodiments, the audio configuration may include, but is not limited to, an output status of the speaker 102 (e.g., mute/unmuted), a cross-over of the speaker 102, or the like. To modify its audio configuration, each speaker 102 may modify one or more filter settings 118(1)-118(n) in response to detecting the bias signal. For instance, the filter settings 118 of any given speaker 102 may be modified to adjust one or more audio features of the speaker 102 (bass, treble, balance, midrange, fading, etc.), a preferred sound mode (movie, music, surround decoder, direct playback, unprocessed, etc.), a movie mode (standard, sci-fi, adventure, drama, sports, etc.), a music mode (concert hall, chamber, cellar club, music video, 2 channel stereo, etc.), reproduction mode (e.g., stereo mode, surround sound mode, mono mode), as well as any other audio characteristics.

FIG. 2 illustrates a flowchart for controlling one or more speaker devices based on a bias signal. For example, in 210, a media content device may transmit using, for example, a communication interface 602 of FIG. 6, media content having a bias signal embedded therein to each of a plurality of speakers. In some embodiments, the bias signal may indicate a current state from among a plurality of states to be activated. In 220, a processor of each speaker 102, for example, a processor 506 of FIG. 5, may configure each respective speaker of the plurality of speakers with a respective state from among the plurality of states. In 230, one or more processors, for example, the processor 506 of FIG. 5, may modify an audio configuration of one or more respective speakers of the plurality of speakers based on the bias signal.

Figure 3:
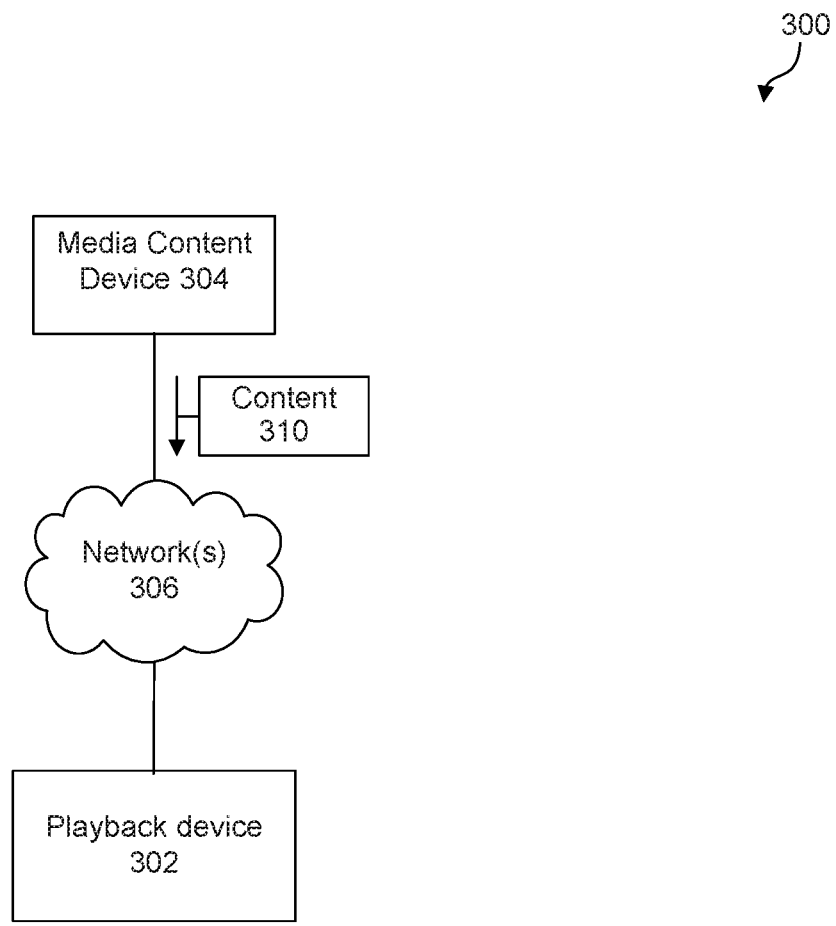
FIG. 3 illustrates another entertainment system, according to some embodiments.

FIG. 3 illustrates another entertainment system, according to some embodiments. Referring to FIG. 3, an entertainment system 300 may include a playback device 302 and a media content device 304. The media content device 304 may be, without limitation, a media player, television, a wireless device, a smartphone, a tablet computer, a laptop/mobile computer, a handheld computer, a server computer, an in-appliance device, streaming media player, a game console, and/or an audio/video receiver. In some embodiments, the media content device 304 may be located in the same listening environment as the playback device 302. Additionally, or alternatively, the media content device 304 may be located remotely from the playback device 302. The playback device 302 and the content device 304 may communicate via a communication network(s) 306. The communication network 306 may include any or all of a wired and/or wireless private network, personal area network (PAN), Local-Area Network (LAN), a Wide-Area Network (WAN), or the Internet.

In some embodiments, the playback device 302 may be any type of a playback device. For example, the playback device 302 may be a speaker, a television, a wireless device, a smartphone, a tablet computer, a laptop/mobile computer, a handheld computer, a wearable, a server computer, a streaming media player, a game console, an audio/video receiver, and so forth.

In some embodiments, media content 310 may be stored on the media content device 304 and transmitted through the playback device 302. In some embodiments, the media content 110 may be combined with a second signal, such that the combined signal is used to measure a latency of the playback device 302. To generate the second signal, the media content device 304 may measure a clocking sample from an internal clock. In some embodiments, the internal clock may be a high-resolution clock. In some embodiments, the content device 304 may measure the clocking sample in response to detecting a connection between the content device 304 and the playback device 302. In some embodiments, the connection between the content device 304 and the playback device 302 may be a wired connection using, for example, a high-definition multimedia interface (HDMI) cable or an optical S/PDIF (Sony/Philips Digital Interface) cable.

In some embodiments, the media content device 304 may encode the clocking sample using an encoder to generate an encoded audio stream. The encoded audio stream may be centered around an inaudible frequency range, i.e., inaudible to humans. For example, the encoded audio stream may be centered around a frequency of about 19.5 Khz, e.g., between 19 Khz and 20 Khz. The clocking sample may be encoded using, for example, a frequency shift keying encoding scheme. It should be understood by those of ordinary skill in the that the frequency shift keying scheme is merely one example coding scheme that may be used, and that other encoding schemes are further contemplated in accordance with aspects of the present disclosure.

The media content device 304 may combine the media content 310 with the encoded audio stream to generate a global audio stream and transmit the global audio stream through the playback device 302. In some instances, the playback device 302 may cause an internal latency with respect to the global audio stream. For example, the playback device 302 may cause the internal latency when normalizing a volume of the global audio stream. After the playback device 302 processes the global audio stream, the playback device 302 may return the global signal back to the media content device 304. The returned signal may include audio samples, such as pulse-code modulation (PCM) samples.

The media content device 304 may decode the audio samples received from the playback device using a decoder to extract timestamps of the playback device. For example, the media content device 304 may decode the audio samples using a decoding scheme configured to decode information encoded using the frequency shift keying scheme. The media content device 304 may then compare the extracted time stamps with the clocking sample to determine the latency of the playback device 302. In some embodiments, the media content device 304 may adjust a timing of the media content 310 based on the latency of the playback device 302.

Figure 4:
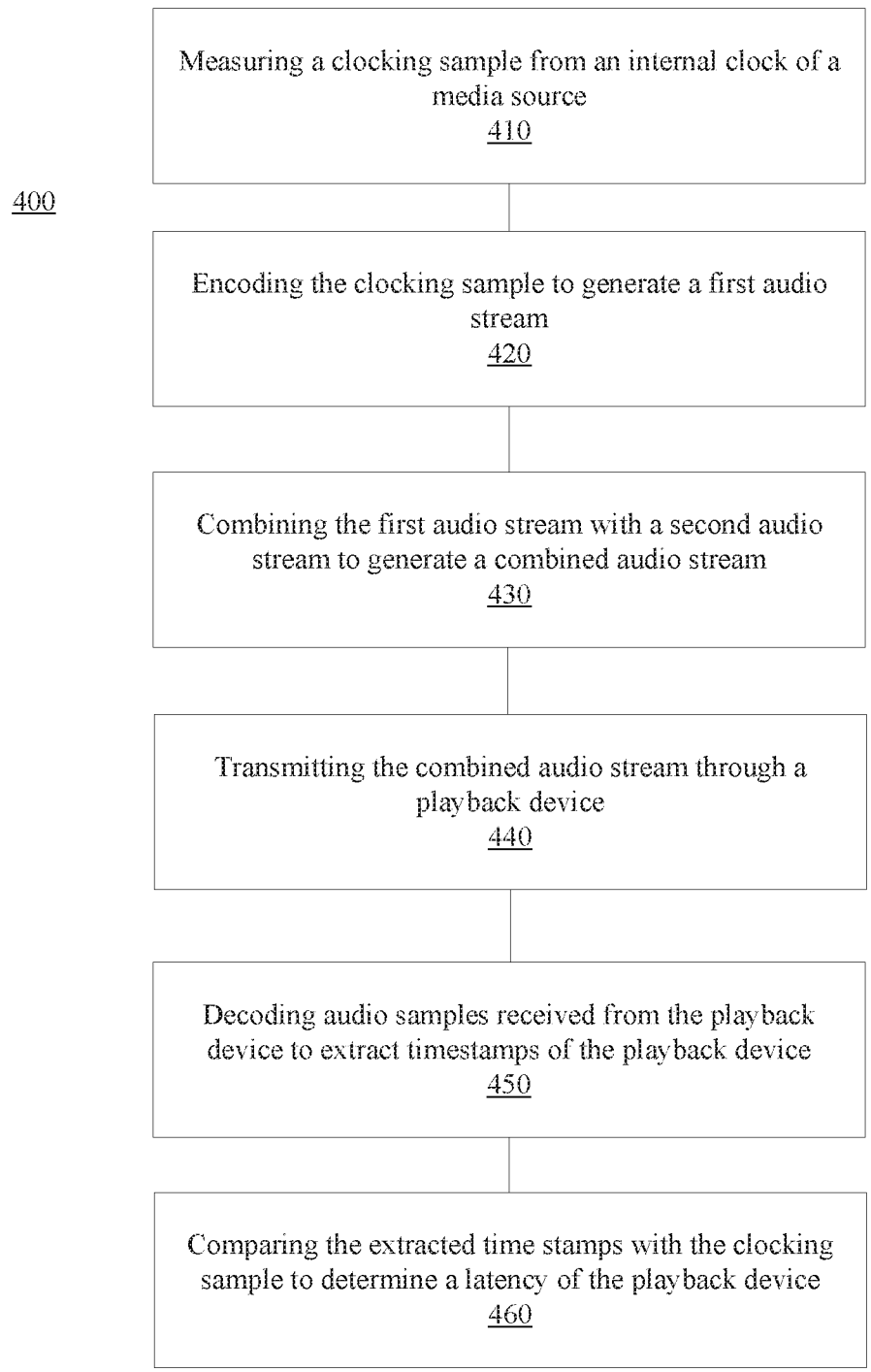
FIG. 4 illustrates a flowchart for measuring latency of a media playback device, according to some embodiments.

FIG. 4 illustrates a flowchart for measuring a latency of a playback device, according to some embodiments. In 410, a processor of a media content device, for example, processor 606 of FIG. 6, may measure a clocking sample from an internal clock, for example, internal clock 612 of FIG. 6, of a media source. In 420, an encoder, for example, encoder 604 of FIG. 6, may encode the clocking sample to generate a first audio stream, and in 430, the processor 606 may combine the first audio stream with a second audio stream to generate a combined audio stream. In 440, a communications interface, for example, communications interface 602 of FIG. 6, may transmit the combined audio stream through a playback device. In 450, a decoder, for example, decoder 614 of FIG. 6, may decode audio samples received from the playback device to extract timestamps of the playback device. In 460, the processor 606 may compare the extracted time stamps with the clocking sample to determine a latency of the playback device 460. It should be understood by those of ordinary skill in the arts that the present disclosure may also be used to verify a complete audio path between the media content device and the playback device.

Figure 5:
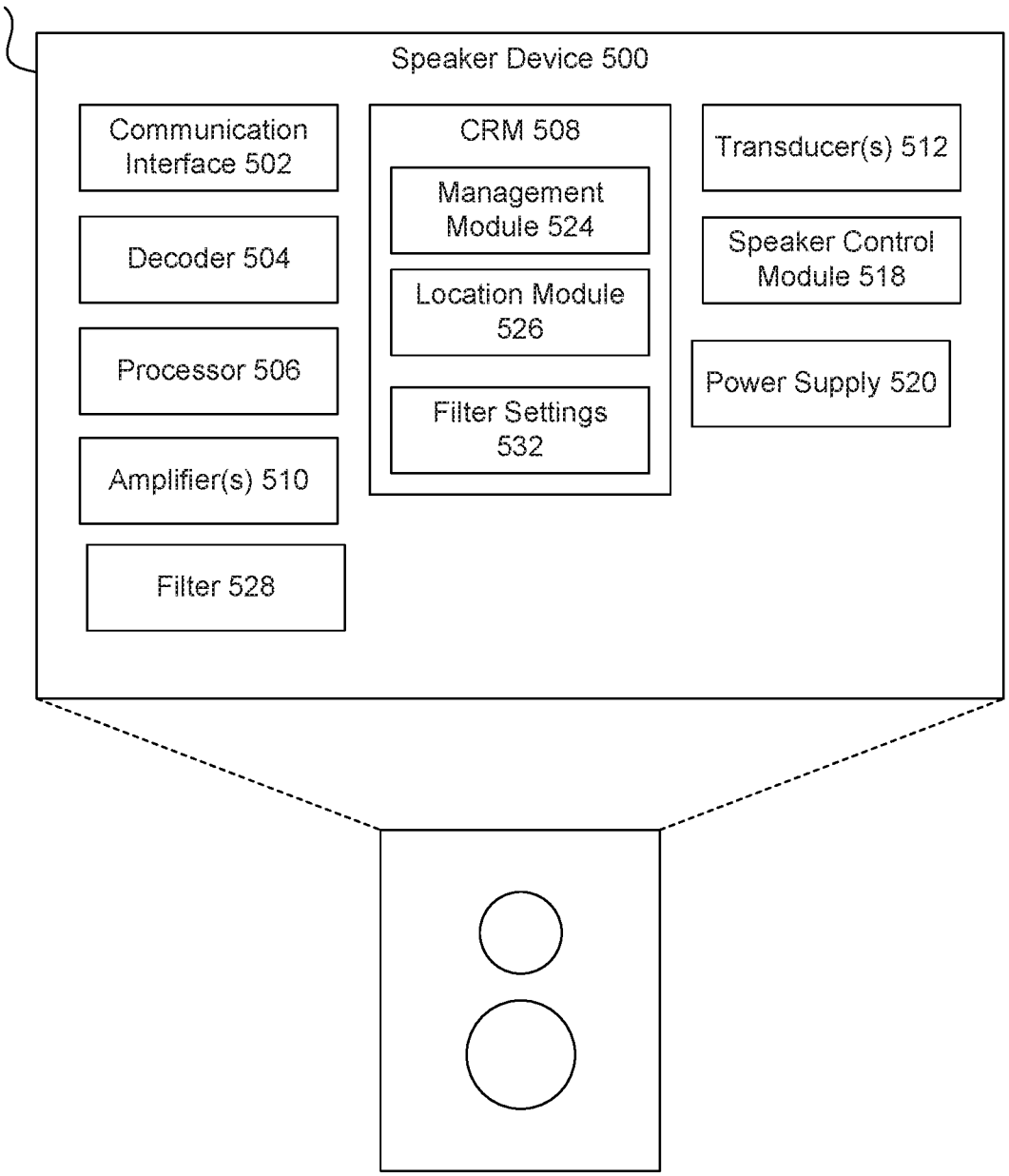
FIG. 5 illustrates a speaker device, according to some embodiments.

FIG. 5 is a block diagram of an example embodiment 500 of a speaker device, e.g., the speakers 102 of FIG. 1. The speaker device 500 may comprise one or more communication interfaces 502 for receiving content (e.g., the media content 110 of FIG. 1) from a content device (e.g., the media content device 104 of FIG. 1), a decoder 504 for decoding the media content into its separate audio components, a processor 506, a speaker control module 518 for receiving user commands via one or more controls (e.g., buttons and/or a remote control interface), a power supply 520, or more filters 528 (e.g., the filters 120), and a speaker cabinet 522 to enclose components of the speaker device 500.

The communication interface(s) 502 may include one or more interfaces and hardware components for enabling communication with various other devices. For example, communication interface(s) 502 facilitate communication through one or more of the Internet, cellular networks, and wireless networks (e.g., Wi-Fi, cellular). The non-transitory, tangible computer readable memory (CRM) 508 may be used to store any number of functional components that are executable by the processor 506. In many implementations, these functional components comprise instructions or programs that are executable by the processors and that, when executed, specifically configure the one or more processors 506 to perform the actions attributed above to the speaker devices (e.g., the speaker devices 102). In addition, the non-transitory, tangible computer readable memory 508 stores data used for performing the operations described herein. In the illustrated example, the functional components stored in the non-transitory computer readable memory 508 include a management module 524, and a location module 526. In some embodiments, the location module 526 may include a global positioning system (GPS) and/or an indoor positioning system (IPS) device. Further, the non-transitory computer readable memory 508 may store state information and filter settings 532 corresponding to the speaker device 500.

The processor 506 may select which portion of the content will be processed. In some embodiments, in a stereo mode, the speaker device 500 processes either the left stereophonic channel or right stereophonic channel. In a surround sound mode, the speaker device 500 selects a signal to process from among the multiple channels. The selection of the playback mode (e.g., stereo mode, mono mode, surround sound mode) may be performed via the speaker control module 518. In some embodiments, the filters 528 modify the content to determine the frequencies of the content that are reproduced by the speaker device 500 in accordance with the filter settings 532. This may be done by performing crossover, phase matching, and time alignment filtering function in a digital implementation. In some examples, the filters 528 may include FIR or IIR filters that implement a crossover filtering technique.

The output of the processor 506 may be a set of filtered digital audio signals, one for each of the transducers 512. These signals may be directed to the inputs of digital amplifiers, which generate high power output signals that drive the speaker transducers 512 to produce an optimal and/or improved reproduction of the content in concert with one or more other speaker devices having different performance capabilities in accordance with the present invention.

Figure 6:
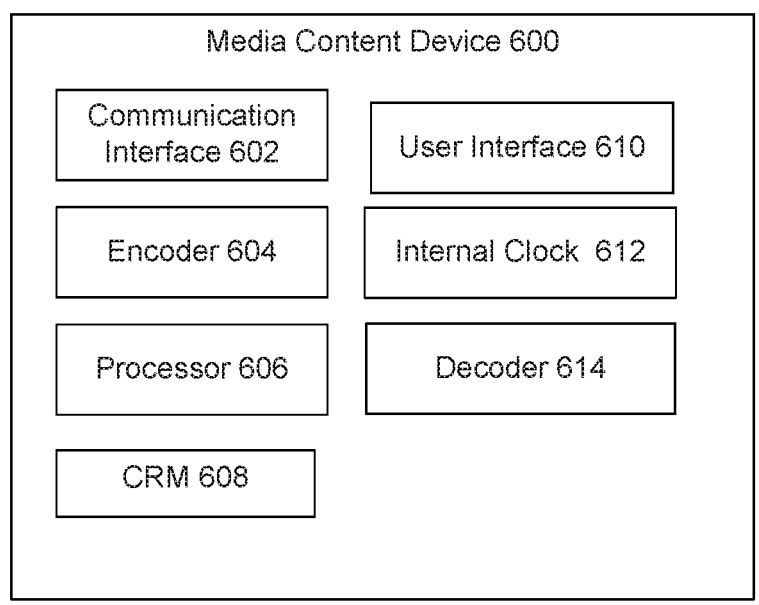
FIG. 6 illustrates a media content device, according to some embodiments.

FIG. 6 illustrates a media content device, according to some embodiments. In some embodiments, the media content device 600 may comprise one or more communication interfaces 602 for transmitting content (e.g., the media content 110 of FIG. 1 and/or media content 310 of FIG. 3) to a playback device (e.g., speakers 102 of FIG. 1 and/or a third-party playback device 320 of FIG. 3), an encoder 604 for encoding, for example, a clock signal, a processor 606 (e.g., a digital signal processor), a non-transitory computer readable memory 608 coupled to the processor 606, a user interface 610, an internal clock 612, and a decoder 614. The communication interface(s) 602 may include one or more interfaces and hardware components for enabling communication with various other devices. For example, communication interface(s) 602 facilitate communication through one or more of the Internet, cellular networks, and wireless networks (e.g., Wi-Fi, cellular). The non-transitory, tangible computer readable memory (CRM) 608 may be used to store the media content (e.g., media content 110 of FIG. 1 and/or media content 310 of FIG. 3), as well as any number of functional components that are executable by the processor 606. In many implementations, these functional components comprise instructions or programs that are executable by the processor 606 and that, when executed, specifically configure the one or more processors 606 to perform the actions attributed above to the media content device (e.g., the media content 110 of FIG. 1 and/or media content 310 of FIG. 3). In addition, the non-transitory, tangible computer readable memory 608 stores data used for performing the operations described herein. In some embodiments, the user interface module 610 may be used to, for example, modify the states of the speakers (e.g., speakers 102 of FIG. 1).

It will be appreciated by those skilled in the art that the functionality of the speaker devices described herein may be performed by other entertainment devices, such as a media player, television, a wireless device, a smartphone, a tablet computer, a laptop/mobile computer, a handheld computer, a server computer, an in-appliance device, streaming media player, a game console, an audio/video receiver, and so forth.

Example Computer System

Figure 7:
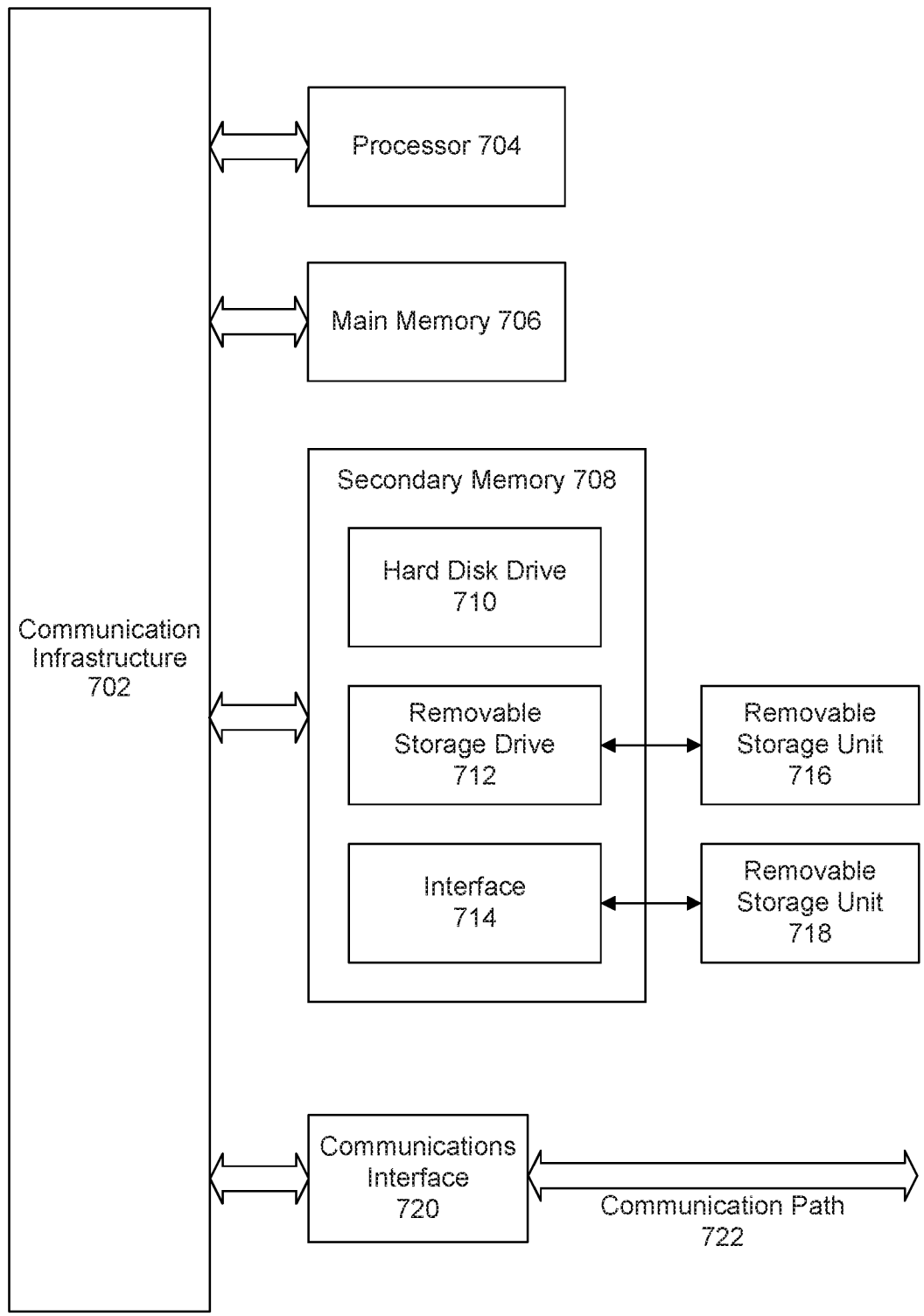
FIG. 7 illustrates an example computer system useful for implementing various embodiments.

Various embodiments can be implemented, for example, using one or more well-known computer systems, such as computer system 700 shown in FIG. 7. Computer system 700 can be any well-known computer capable of performing the functions described herein, such as computers available from International Business Machines, Apple, Sun, HP, Dell, Sony, Toshiba, etc.

Computer system 700 includes one or more processors (also called central processing units, or CPUs), such as a processor 704. Processor 704 is connected to a communication infrastructure or bus 706.

Computer system 700 also includes user input/output device(s) 703, such as monitors, keyboards, pointing devices, etc., which communicate with communication infrastructure 706 through user input/output interface(s) 702.

Computer system 700 also includes a main or primary memory 708, such as random access memory (RAM). Main memory 708 may include one or more levels of cache. Main memory 708 has stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 includes a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 reads from and/or writes to removable storage unit 718 in a well-known manner.

According to an exemplary embodiment, secondary memory 710 may include other means, instrumentalities or other approaches for allowing computer programs and/or other instructions and/or data to be accessed by computer system 700. Such means, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired and/or wireless, and which may include any combination of LANs, WANs, the Internet, etc. Control logic and/or data may be transmitted to and from computer system 700 via communication path 726.

In an embodiment, a tangible apparatus or article of manufacture comprising a tangible computer useable or readable medium having control logic (software) stored thereon is also referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method comprising:
measuring, by a media content device, in response to detecting a wired connection between the media content device and a playback device, a clocking sample from an internal clock of the media content device that stores media content;
encoding the clocking sample to generate a first audio stream;
combining, by the media content device, the first audio stream with a second audio stream to generate a combined audio stream, wherein the second audio stream is the media content;
transmitting, by the media content device, the combined audio stream through the playback device, wherein the combined audio stream includes the media content and is processed by the playback device;
receiving, by the media content device, a returned signal from the playback device, wherein the returned signal includes audio samples;
decoding, by the media content device, the audio samples received from the playback device to extract timestamps of the playback device; and
comparing, by the media content device, the extracted timestamps of the playback device with the clocking sample of the media content device to determine a latency of the playback device.

2. The method of claim 1, further comprising adjusting a timing of the second audio stream based on the latency of the playback device.

3. The method of claim 1, wherein the wired connection comprises a high-definition multimedia interface (HDMI) connection or an optical Sony/Philips Digital Interface (S/PDIF) cable.

4. The method of claim 1, wherein the playback device comprises an audio-visual transceiver.

5. The method of claim 1, wherein encoding the clocking sample comprises encoding the clocking sample using a frequency shift keying scheme.

6. The method of claim 1, wherein the first audio stream is generated at a frequency inaudible to humans.

7. The method of claim 1, wherein the first audio stream is centered at a frequency of about 19.5 Khz.

8. A system comprising:
a memory; and
a processor coupled to the memory and configured to:
measure a clocking sample from an internal clock of a media content device that stores media content in response to detecting a wired connection between the media content device and a playback device;
encode the clocking sample to generate a first audio stream;
combine the first audio stream with a second audio stream to generate a combined audio stream, wherein the second audio stream is the media content;

transmit the combined audio stream through the playback device, wherein the combined audio stream includes the media content and is processed by the playback device;

receive, by the media content device, a returned signal from the playback device, wherein the returned signal includes audio samples;

decode, by the media content device, the audio samples received from the playback device to extract timestamps of the playback device; and compare, by the media content device, the extracted timestamps of the playback device with the clocking sample of the media content device to determine a latency of the playback device.

9. The system of claim 8, wherein the processor is further configured to adjust a timing of the second audio stream based on the latency of the playback device.

10. The system of claim 8, wherein the wired connection comprises a high-definition multimedia interface (HDMI) connection or an optical Sony/Philips Digital Interface (S/PDIF) cable.

11. The system of claim 8, wherein the playback device comprises an audio-visual transceiver.

12. The system of claim 8, wherein, to encode the clocking sample, the processor is further configured to encode the clocking sample using a frequency shift keying scheme.

13. The system of claim 8, wherein the first audio stream is generated at a frequency inaudible to humans.

14. A non-transitory, tangible computer-readable medium having instructions stored thereon that, when executed by at least one computing device, cause the at least one computing device to perform operations comprising:

measuring, by a media content device, in response to detecting a wired connection between the media content device and a playback device, a clocking sample from an internal clock of the media content device;

encoding the clocking sample to generate a first audio stream;

combining, by the media content device, the first audio stream with a second audio stream to generate a combined audio stream, wherein the second audio stream is the media content;

transmitting, by the media content device, the combined audio stream through the playback device, wherein the combined audio stream includes the media content and is processed by the playback device;

receiving, by the media content device, a returned signal from the playback device, wherein the returned signal includes audio samples;

decoding, by the media content device, the audio samples received from the playback device to extract timestamps of the playback device; and comparing, by the media content device, the extracted time stamps of the playback device with the clocking sample of the media content device to determine a latency of the playback device.

15. The medium of claim 14, wherein the operations further comprise adjusting a timing of the second audio stream based on the latency of the playback device.

* * * * *